United States Patent
Hirata

(10) Patent No.: US 7,689,728 B2
(45) Date of Patent: Mar. 30, 2010

(54) METHOD AND APPARATUS FOR DESCRIBING ACPI MACHINE LANGUAGE IN COMPUTER HAVING MULTIBRIDGE PCI STRUCTURE, AND PROGRAM THEREOF

(75) Inventor: Yutaka Hirata, Tokyo (JP)

(73) Assignee: NEC Corporation, Tokyo (JP)

( * ) Notice: Subject to any disclaimer, the term of this patent is extended or adjusted under 35 U.S.C. 154(b) by 165 days.

(21) Appl. No.: 11/709,828

(22) Filed: Feb. 23, 2007

(65) Prior Publication Data

US 2007/0204092 A1 Aug. 30, 2007

(30) Foreign Application Priority Data

Feb. 24, 2006 (JP) ............... 2006-048681

(51) Int. Cl.
*G06F 3/00* (2006.01)
*G06F 9/00* (2006.01)

(52) U.S. Cl. .................. 710/8; 710/312; 713/2
(58) Field of Classification Search .......... 710/8, 710/10, 62, 302–304, 306, 312; 713/2, 100
See application file for complete search history.

(56) References Cited

U.S. PATENT DOCUMENTS

| | | | | |
|---|---|---|---|---|
| 6,185,677 | B1 * | 2/2001 | Nijhawan | 713/2 |
| 6,233,638 | B1 * | 5/2001 | Porterfield | 710/311 |
| 6,963,947 | B2 * | 11/2005 | Piatetsky et al. | 710/311 |
| 7,284,083 | B2 * | 10/2007 | Oshins et al. | 710/315 |
| 2003/0065752 | A1 * | 4/2003 | Kaushik et al. | 709/220 |
| 2006/0248282 | A1 * | 11/2006 | Rostampour et al. | 711/141 |
| 2008/0148033 | A1 * | 6/2008 | Sumner et al. | 713/1 |

FOREIGN PATENT DOCUMENTS

| | | |
|---|---|---|
| JP | 05-028088 | 2/1993 |
| JP | 2000-222346 | 8/2000 |
| JP | 2005-235208 | 9/2005 |
| WO | WO 00/19301 | 4/2000 |

OTHER PUBLICATIONS

Definition of PCI Configuration Space by Wikipedia, <http://en.wikipedia.org/wiki/PCI_Configuration_Space>, accessed on Mar. 10, 2009.*

* cited by examiner

*Primary Examiner*—Khanh Dang
(74) *Attorney, Agent, or Firm*—Young & Thompson

(57) ABSTRACT

There is provided a method for describing an ACPI machine language table used in a computer system having a multibridge PCI structure, which enables an OS to support hot plugs for PCI devices subordinate to a PCI multibridge. Upon receiving a call requesting a resource information method for a PCI device from an ACPI driver on an OS, a PCI configuration access is made to a subordinate bridge in a PCI device side, so that the ACPI machine language table supplied from a BIOS returns resource information of the PCI device. A PCI configuration access is made to a superordinate bridge in a PCI system bus side, to obtain resource information of the subordinate bridge. The resource information of the subordinate bridge is obtained from the superordinate bridge, and secondary resource information is obtained from a PCI configuration space of the subordinate bridge.

4 Claims, 5 Drawing Sheets

METHOD AND APPARATUS FOR DESCRIBING ACPI MACHINE LANGUAGE IN COMPUTER HAVING MULTIBRIDGE PCI STRUCTURE, AND PROGRAM THEREOF

BACKGROUND OF THE INVENTION

1. Field of the Invention

The present invention relates to a method for describing an ACPI (Advanced Configuration and Power Interface) machine language table for use in a computer having a multibridge PCI (Peripheral Component Interface) structure.

2. Description of the Related Art

ACPI specs are established on computers such as personal computers (PC), including laptop/desktop computers, and servers, to provide industry-standard interface for system configuration and power management. The ACPI specs define ACPI interfaces including interfaces between hardware, a BIOS (Basic Input Output System) software, and an OS (Operating System) software.

An ACPI functions not only for power management of a system but also to abstractly interpret hardware configuration. The ACPI supplies hardware configuration information to an OS. Based on the configuration information from the ACPI, the OS can initialize hardware.

The ACPI describes the abstract hardware configuration information, in an ACPI Machine Language (AML) which is called "p-codes". The AML is not an assembly language (machine language) specific to a certain platform but is constituted by pseudo codes for virtual machines supported by an ACPI-compatible OS. Namely, an AML is a pseudo-code assembly language which is interpreted by an ACPI driver (a device driver for processing an ACPI) on an OS.

The ACPI source language (ASL) is a programming language that is used by BIOS developers to create AML images. Using a dedicated AML compiler, an AML is generated from an ASL. The ASL is used to describe system hardware configuration information.

According to a conventional ACPI description method based on a BIOS, hardware configuration of a system is provided to an OS, as exact configuration information without changes. The OS according to ACPI specs controls hardware, based on the configuration information provided by the BIOS.

FIG. 1 shows an example of a conventional ACPI-compatible system employing a multibridge PCI structure (hardware configuration in which PCI-to-PCI bridges are connected each other). This hardware configuration information is provided to an OS by BIOS, exactly maintained in an original form of the information.

There is another type of device which transparently connects PCI devices behind a PCI-to-PCI bridge (for example, refer to JP-A-2000-222346).

However, an OS which does not support a multibridge PCI structure gives rise to the following problems. That is, the OS cannot allow PCI hot plugs (insertion/removal of PCI devices in a system online state) for PCI devices subordinate to a multibridge or cannot recognize PCI devices themselves.

Namely, a first problem is that if an OS which does not support PCI hot plugs subordinate to a multibridge is operated on a system, PCI devices cannot be connected by hot plugs in some cases.

A second problem is that when devices are bridged too deep by multibridges, an OS cannot recognize a PCI device in the lowermost level due to limitations to implementation specs of the OS.

SUMMARY OF THE INVENTION

The present invention therefore has an object to improve ACPI description and BIOS implementation for an OS which does not natively support a multibridge PCI structure, thereby to provide the OS with an apparatus and method for describing an ACPI machine language table, and a program thereof, which enable the OS to support PCI hot plugs for PCI devices subordinate to multibridges.

In an aspect of the invention to achieve the above object, there is provided a method for describing an ACPI machine language table for use in a computer having a multibridge PCI structure that connects the computer to a PCI device via plural bridges from a PCI system bus, the method comprising steps of: making a PCI configuration access to a subordinate bridge in a PCI device side, so that the ACPI machine language table supplied from a BIOS returns resource information of the PCI device upon receiving a call requesting a resource information method for the PCI device from an ACPI driver on an OS; making a PCI configuration access to a superordinate bridge in a system bus side, to obtain resource information of the subordinate bridge; and obtaining the resource information of the subordinate bridge from the superordinate bridge, and obtaining secondary resource information from a PCI configuration space of the subordinate bridge.

Preferably in the method configured as described above, the machine language table returns information concerning the superordinate and subordinate bridges as information hidden from the OS, as well as returns information concerning the PCI device as information not hidden from the OS.

According to the method configured as described above, hardware configuration shown in FIG. 1 can be recognized as virtual hardware configuration shown in FIG. 2 by the OS. Therefore, a PCI device subordinate to a multibridge can virtually be handled just as if the PCI device were subordinate to a system bus.

A first effect of the invention is that even an OS which supports PCI hot plugs only for PCI devices subordinate to a system bus can be allowed to support PCI hot plugs for PCI devices subordinate to multibridges. This is because a BIOS hides existence of bridges from the OS and causes a multibridge structure as hardware to pretend that PCI devices are subordinate to the system bus.

A second effect of the invention is that an OS can recognize a PCI device in a lowermost level even in a case where bridges are established so deep that the OS cannot recognize the PCI device in the lowermost level due to implementation specs of the OS. This is because a BIOS hides existence of bridges from the OS and causes the PCI device to pretend to be subordinate to a system bus.

DETAILED DESCRIPTION OF THE PREFERRED EMBODIMENTS

Hereinafter, a preferred embodiment of the present invention will be described with reference to the drawings.

Figure 1:
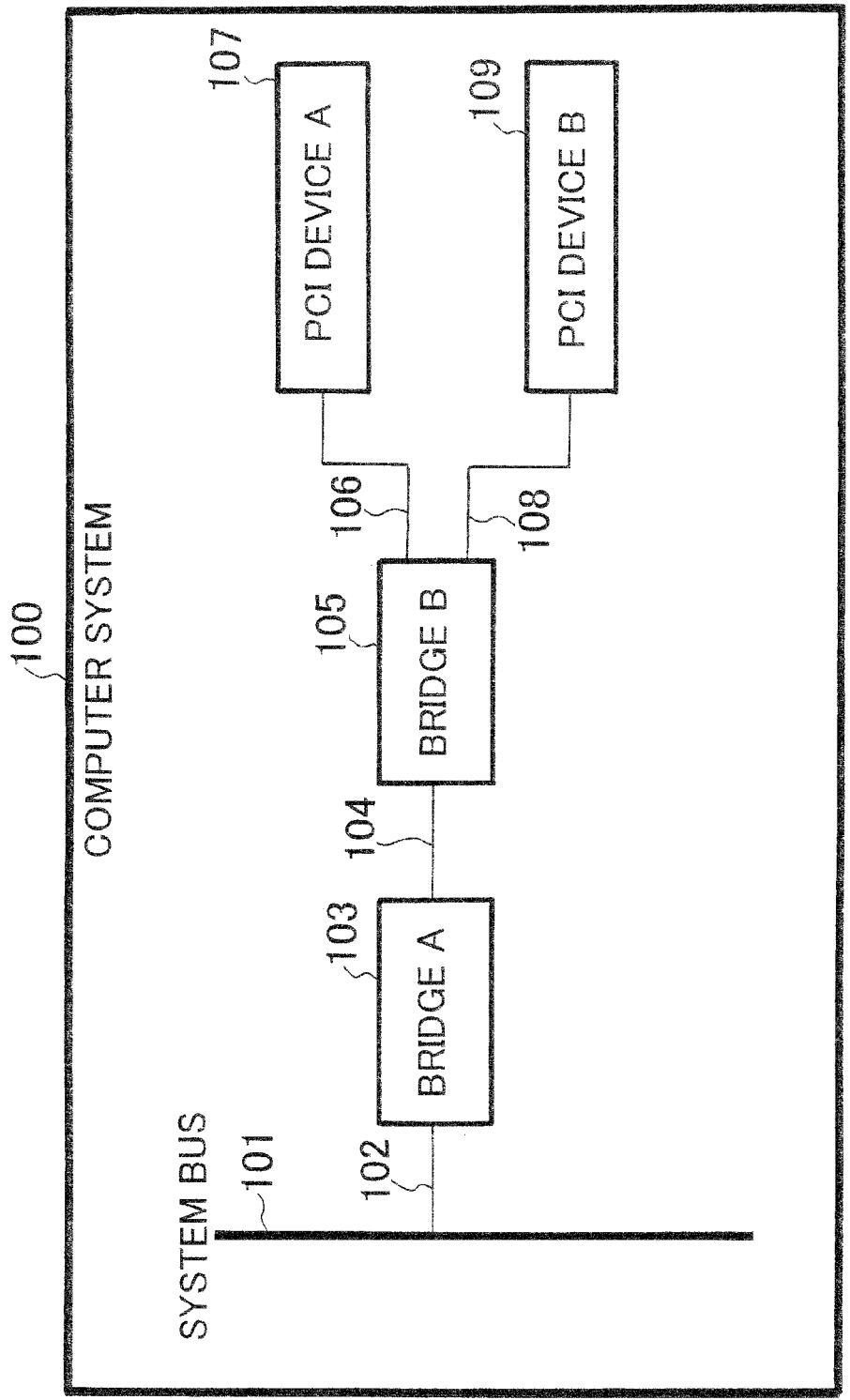
FIG. 1 shows an exemplary configuration of an ACPI compatible system having a multibridge PCI structure according to an embodiment of the present invention.

FIG. 1 shows exemplary configuration of an ACPI-compatible system having a multibridge PCI structures. The computer system 100 is, for example, a personal computer (PC) such as a laptop/desktop computer or a server. The system bus 101 expresses overall buses and devices in the computer system 100 and interconnects a processor and chipset.

A bridge A103 is a circuit for connecting two PCI busses each other and is called a "PCI-to-PCI bridge". The system bus 101 and the bridge A103 are interconnected via a host bus 102. The host bus means a bus which is connected subordinate to the system bus.

The bridge B105, as well as the bridge A103, is a PCI-to-PCI bridge and connects subordinate PCI devices to the bridge A103. As shown in FIG. 1, the configuration in which plural bridges that is the bridges A103 and B105, are connected each other via the host bus 104 is called a multibridge structure.

The PCI device A107 is connected subordinate to the bridge B105 via a PCI bus 106. Similarly, the PCI device B109 is connected subordinate to the bridge B105 via a PCI bus 108.

In conventional systems, a BIOS notifies the OS of multibridges shown in FIG. 1 as exact hardware configuration.

Figure 2:
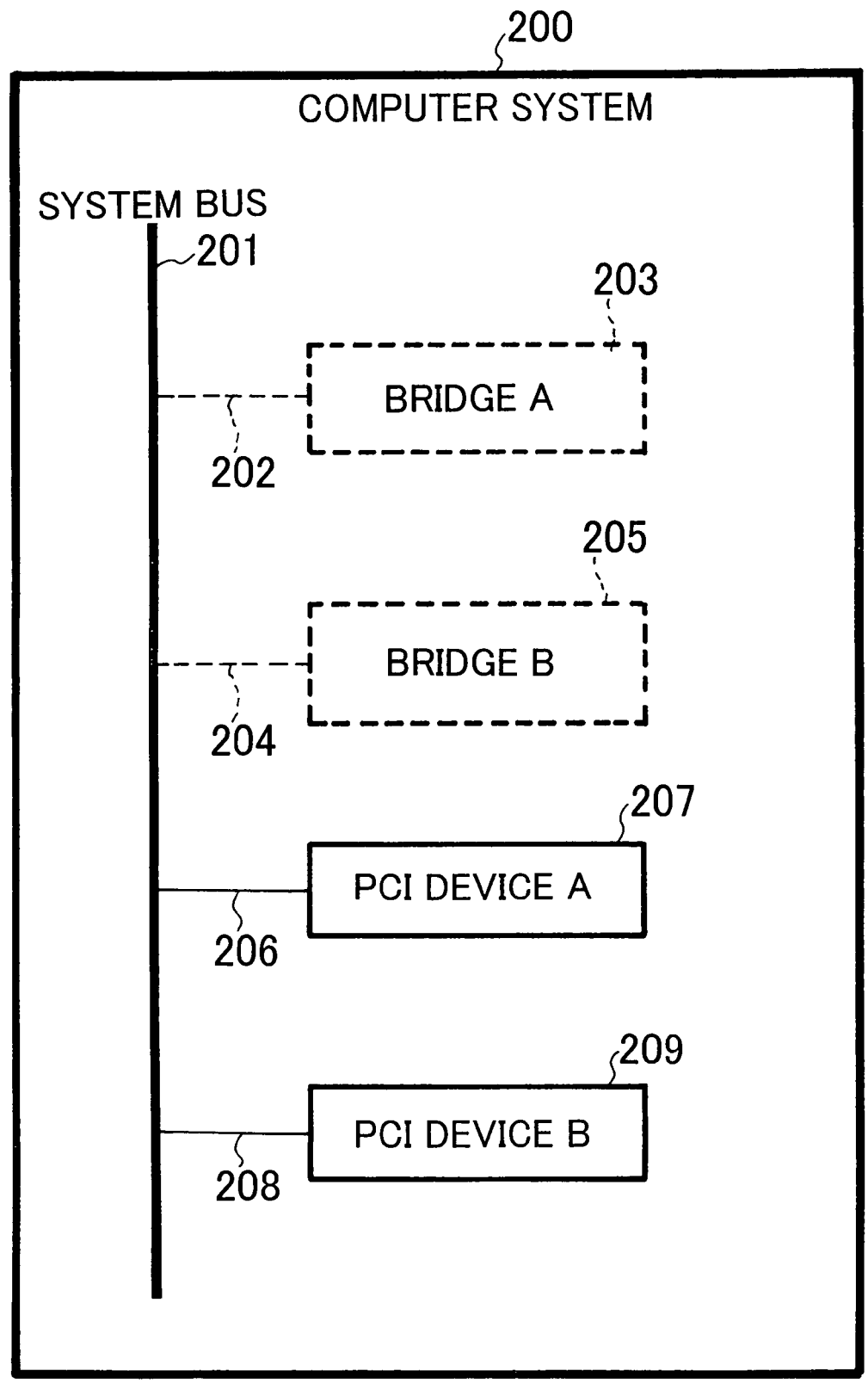
FIG. 2 shows a virtual hardware configuration which is provided for an OS from a BIOS.

FIG. 2 shows virtual hardware configuration which is provided for an OS by a BIOS according to the embodiment of the present invention. The computer system 200 is, for example, a personal computer (PC) such as a laptop/desktop computer, or a server. The system bus 201 expresses overall buses and devices in the computer system 200 and interconnects a processor and a chipset.

A bridge A203 is a circuit for connecting two PCI buses each other and is called a "PCI-to-PCI bridge". The system bus 201 and the bridge A203 are connected via a host bus 202. The host bus means a bus which is connected subordinate to the system bus.

In an ASL (AML), a BIOS defines the bridge A203 as a device object (a device definition method in the ASL). In a status method (a control method called by a ACPI driver) which supports device objects, a value hidden from an OS is returned.

According to the status method, status of a device object is expressed by use of return values S1 (hidden from the OS) and S2 (not hidden from the OS). The status method is described within ASL codes, is called by ACPI drivers on the OS, and is capable of knowing status of device objects. The bridge A203 in FIG. 2 is hidden from the OS for the purpose of hiding existence of the bridge.

A bridge B205 shown in FIG. 2 is a circuit for connecting two PCI buses each other and is also called a "PCI-to-PCI bridge". The system bus 201 and the bridge B205 are connected via a host bus 204 in a pseudo manner, and describe configuration information in ASL. In ASL, BIOS defines the bridge B205 as a device object. In a status method which supports device objects, S1 (value hidden from the OS) is returned. The bridge B205 is hidden from the OS for the purpose of hiding the existence of the bridge from the OS.

A PCI device A207 is connected subordinate to the system bus 201 via a host bus 206. Since the PCI device A207 needs to pretend, to the OS, to be directly subordinate to the host bus, S2 (value not hidden from the OS) is returned according to the ASL status method.

The PCI device B209 is connected subordinate to the system bus 201 via a host bus 208. Since the PCI device A209 needs to pretend, to the OS, to be a PCI device just below the host bus, S2 (the value not hidden from the OS) is returned according to the ASL status method.

Figure 3:
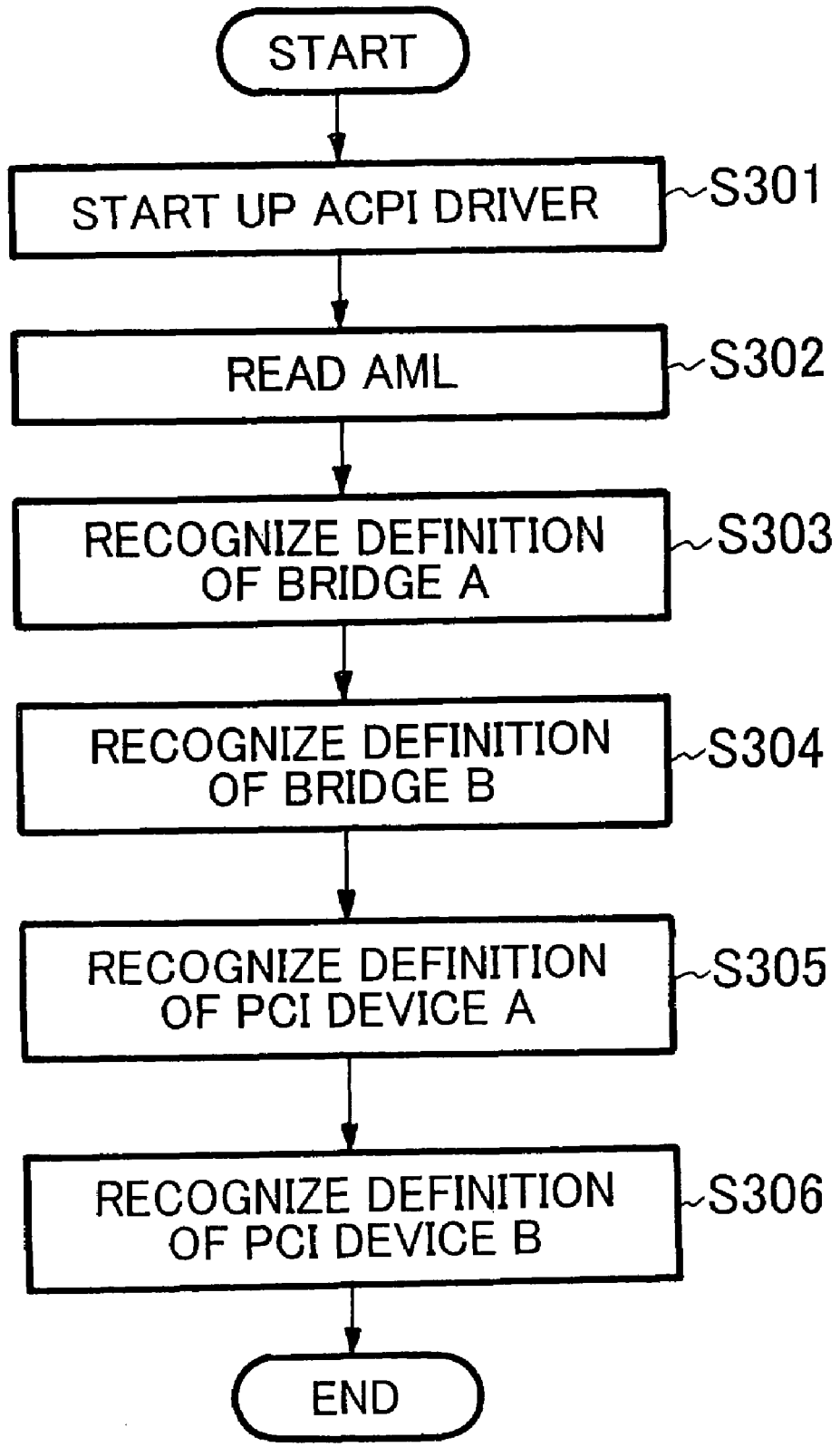
FIG. 3 is a flowchart showing operation through which an ACPI driver reads an AML table.

FIG. 3 shows operation through which an ACPI driver included in an OS reads an AML table provided by a BIOS. When the OS starts up, the ACPI driver reads the AML table from a BIOS and obtains hardware configuration information (steps S301 and S302). In FIG. 2, although the bridges A203 and B205 are defined as device objects, the bridges are hidden from the OS (steps S303 and S304). Therefore, the OS does not perform bus-scanning on any structure subordinate to the bridges. The PCI devices A207 and B209 have been defined as device objects according to the ASL, and return values not hidden from the OS according to the status method. As a result, the OS can recognize the PCI devices A207 and B209 (steps S305 and S306).

Figure 4:
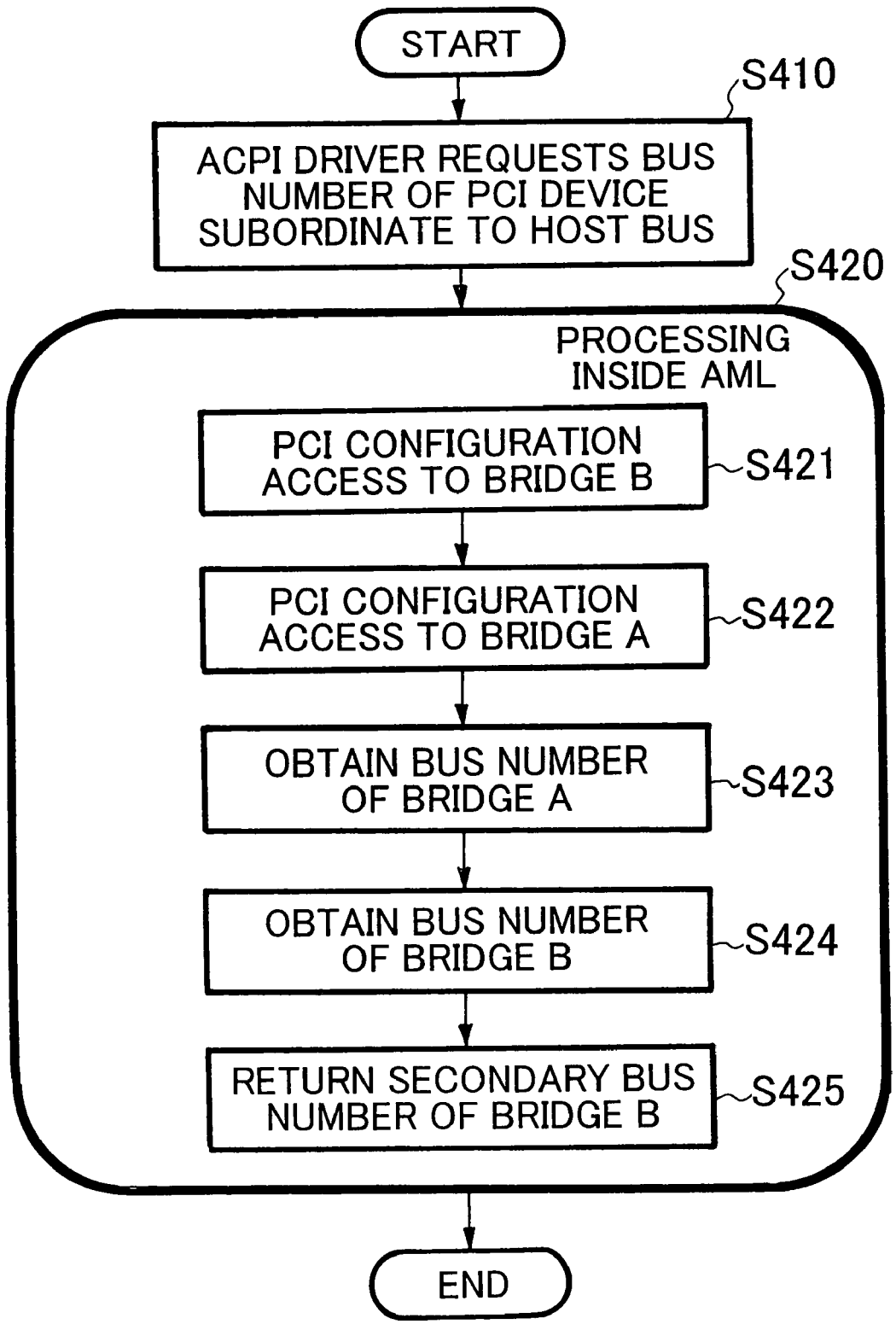
FIG. 4 is a flowchart showing how an ACPI driver obtains a bus number of a PCI device from an AML table.

FIG. 4 shows a sequence through which an ACPI driver obtains a bus number of a PCI device from an AML table provided by an BIOS. When the OS makes a PCI configuration access (a special access to a PCI device for plug and play) to a PCI device, a bus number (a numeric value from 0 to 255) is needed. The bus number is obtained as the ACPI driver calls a bus number method in the AML table (step S410). The bus number method is described in an ASL. After the ACPI driver calls the method, the sequence enters into processing inside the AML table (step S420). The ACPI driver need not know about the processing inside the AML table in step S420.

Step S420 shows a flow until a bus number of a PCI device is returned. In actual hardware, the PCI devices A207 and B209 in FIG. 2 are connected subordinate to the bridge B205. Therefore, bus numbers of PCI devices correspond to secondary bus numbers which are stored in a PCI configuration space (a special memory space specific to PCI devices for plug and play) of the bridge B205. As a result, to return bus numbers of the PCI devices A207 and B209, a PCI configuration access needs to be made to the bridge B205 (step S421).

To make a PCI configuration access to the bridge B205, the bus number of the bridge 205 itself is needed. FIG. 2 exemplifies multibridge configuration in which the bus number of the bridge B205 corresponds to a secondary bus number stored in the PCI configuration space of the bridge A203 which is a bridge superordinate to the bridge B205. To obtain the bus number of the bridge B205, a PCI configuration access needs to be made to the bridge A203 (step S422).

The bus number of the bridge A203 itself is obtained by reading a bus number register for the host bus 202 (step S423). A bus number of the bridge B205 is obtained from the bridge A203 (step S424). A secondary bus number is obtained from the PCI configuration space for the bridge B205, and is returned to the ACPI driver (step S425).

Figure 5:
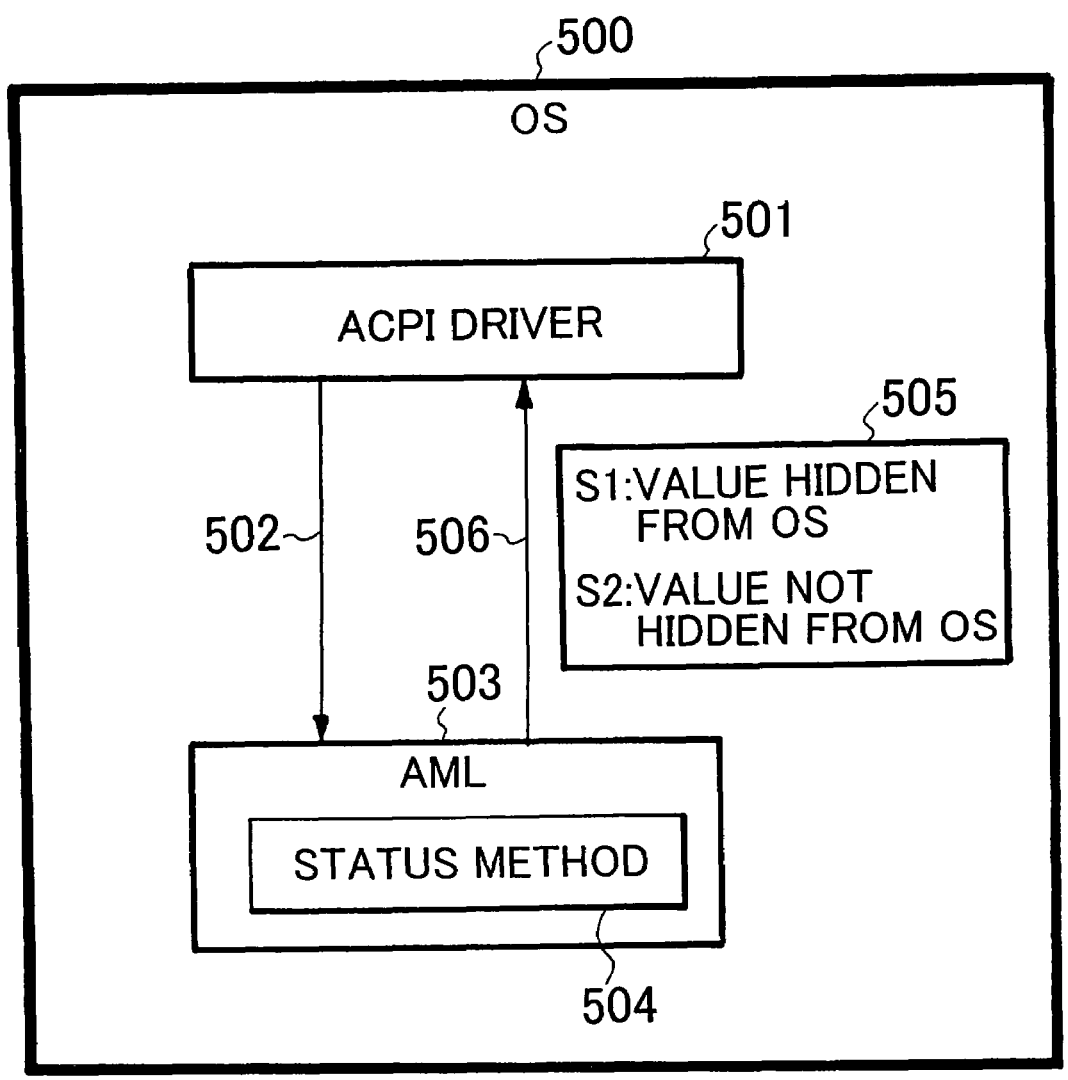
FIG. 5 shows a mechanism in which an ACPI driver carries out a status method in an AML.

FIG. 5 shows a mechanism through which an ACPI driver implements a status method according to an AML table provided by a BIOS. An OS 500 is an operating system which operates on a computer system. An ACPI driver 501 is one of modules included in the OS 500 and interprets an AML 503. The AML 503 is binary data described in an ACPI machine language, and includes a status method 504 which indicates a condition of a device object.

The ACPI driver 501 calls a status method 504 in the AML 503 to obtain the condition of the device object (502). The status method 504 returns the condition of the device object as either S1 (value hidden from the OS) or S2 (value not hidden from the OS) (505 and 506)

As described above, in a multibridge PCI structure, required resource information is finally returned to an ACPI driver by recursively obtaining resource information. Regarding other resource information (such as a memory map or I/O map range) than bus numbers, an ASL can be described by a similar sequence to those described above.

According to the embodiment of the present invention, internal implementation of an ASL is designed in consideration of multibridges. However, by only modifying the ACPI description method, the internal implementation of an ASL can be designed so that the OS need not consider multibridges.

Although the exemplary embodiments of the present invention have been described in detail, it should be understood that various changes, substitutions and alternatives can be made therein without departing from the sprit and scope of the invention as defined by the appended claims. Further, it is the inventor's intent to retain all equivalents of the claimed invention even if the claims are amended during prosecution.

What is claimed is:

1. A method for describing an ACPI machine language table for use in a computer having a multibridge structure that connects the computer to a PCI device via plural bridges from a PCI system bus, the method comprising steps of:
   making a PCI configuration access to a subordinate bridge in a PCI device side, so that the ACPI machine language table supplied from a BIOS returns resource information of the PCI device upon receiving a call requesting a resource information method for the PCI device from an ACPI driver on an OS;
   making a PCI configuration access to a superordinate bridge in a system bus side, to obtain resource information of the subordinate bridge; and
   obtaining the resource information of the subordinate bridge from the superordinate bridge, and obtaining secondary resource information from a PCI configuration space of the subordinate bridge, wherein the machine language table returns information concerning the superordinate and subordinate bridges as information hidden from the OS, as well as information concerning the PCI device as information not hidden from the OS.

2. An apparatus for describing an ACPI machine language table for use in a computer having a multibridge structure that connects the computer to a PCI device via plural bridges from a PCI system bus, said apparatus comprising:
   means for making a PCI configuration access to a subordinate bridge in a PCI device side, so that the ACPI machine language table supplied from a BIOS returns resource information of the PCI device upon receiving a call requesting a resource information method for the PCI device from an ACPI driver on an OS;
   means for making a PCI configuration access to a superordinate bridge in a system bus side, to obtain resource information of the subordinate bridge in response to the requesting resource information by the means for making the PCI configuration access to the subordinate bridge in the PCI device side; and
   means for obtaining the resource information of the subordinate bridge from the superordinate bridge, and for obtaining secondary resource information from a PCI configuration space of the subordinate bridge in response to the requesting resource information in response to the means for making the PCI configuration access to the superordinate bridge,
   wherein the machine language table returns information concerning the superordinate and subordinate bridges as information hidden from the OS, as well as information concerning the PCI device as information not hidden from the OS.

3. A computer readable recording medium with computer program recorded thereon for causing a computer to execute a method for describing an ACPI machine language table for use in a computer having a multibridge structure that connects the computer to a PCI device via plural bridges from a PCI system bus, the method comprising steps of:
   making a PCI configuration access to a subordinate bridge in a PCI device side, so that the ACPI machine language table supplied from a BIOS returns resource information of the PCI device upon receiving a call requesting a resource information method for the PCI device from an ACPI driver on an OS;
   making a PCI configuration access to a superordinate bridge in a system bus side, to obtain resource information of the subordinate bridge; and
   obtaining the resource information of the subordinate bridge from the superordinate bridge, and obtaining secondary resource information from a PCI configuration space of the subordinate bridge,
   wherein the machine language table returns information concerning the superordinate and subordinate bridges as information hidden from the OS, as well as information concerning the PCI device as information not hidden from the OS.

4. A computer system having a multibridge structure that connects a computer to a PCI device via plural bridges from a PCI system bus, said computer system comprising an apparatus configured to describe an ACPI machine language table for use in the computer, said apparatus comprising:
   means for making a PCI configuration access to a subordinate bridge in a PCI device side, so that the ACPI machine language table supplied from a BIOS returns resource information of the PCI device upon receiving a call requesting a resource information method for the PCI device from an ACPI driver on an OS;
   means for making a PCI configuration access to a superordinate bridge in a system bus side, to obtain resource information of the subordinate bridge in response to the requesting resource information by the means for making the PCI configuration access to the subordinate bridge in the PCI device side; and
   means for obtaining the resource information of the subordinate bridge from the superordinate bridge, and for obtaining secondary resource information from a PCI configuration space of the subordinate bridge in response to the requesting resource information in response to the means for making the PCI configuration access to the superordinate bridge,
   wherein the machine language table returns information concerning the superordinate and subordinate bridges as information hidden from the OS, as well as information concerning the PCI device as information not hidden from the OS.

* * * * *